US006147034A

United States Patent [19]

Jones et al.

[11] Patent Number: 6,147,034

[45] Date of Patent: Nov. 14, 2000

[54] GELLING AGENT FOR HYDROCARBON LIQUID AND METHOD OF USE

[75] Inventors: Cruise K. Jones; Grahame N. Taylor, both of Houston, Tex.

[73] Assignee: Nalco/Exxon Energy Chemicals, L.P., Sugar Land, Tex.

[21] Appl. No.: 09/404,266

[22] Filed: Sep. 20, 1999

Related U.S. Application Data

[63] Continuation-in-part of application No. 08/951,388, Oct. 16, 1997, abandoned.

[51] Int. Cl.[7] .............................. C09K 3/00; E21B 43/26

[52] U.S. Cl. .......................... 507/238; 507/922; 516/104; 166/308

[58] Field of Search .................................... 507/238, 922; 44/268; 516/104; 987/227; 166/308

[56] References Cited

U.S. PATENT DOCUMENTS

| | | | |
|---|---|---|---|
| 3,328,493 | 6/1967 | Larrison | 558/116 |
| 3,480,083 | 11/1969 | Oleen | 507/238 |
| 3,502,587 | 3/1970 | Stanford et al. | 252/180 |
| 3,578,731 | 5/1971 | Mange et al. | 558/165 |
| 3,965,003 | 6/1976 | Stanford et al. | 507/238 |
| 4,104,173 | 8/1978 | Gay et al. | 507/238 |
| 4,200,540 | 4/1980 | Burnham | 507/238 |
| 4,200,545 | 4/1980 | Clason et al. | 507/238 |
| 4,316,810 | 2/1982 | Burnham | 507/238 |
| 4,787,994 | 11/1988 | Thorne et al. | 507/238 |
| 4,877,894 | 10/1989 | Huddleston | 558/113 |
| 4,886,609 | 12/1989 | Walton | 507/238 |
| 5,057,233 | 10/1991 | Huddleston | 507/238 |
| 5,190,675 | 3/1993 | Gross | 507/238 |
| 5,202,035 | 4/1993 | Huddleston | 507/238 |
| 5,274,101 | 12/1993 | O'Lenick, Jr. | 548/112 |
| 5,417,287 | 5/1995 | Smith et al. | 166/308 |
| 5,514,645 | 5/1996 | McCabe et al. | 507/238 |
| 5,571,315 | 11/1996 | Smith et al. | 106/285 |

FOREIGN PATENT DOCUMENTS

| | | |
|---|---|---|
| 0 551 760 A2 | 7/1993 | European Pat. Off. . |
| 951445 | 3/1964 | United Kingdom . |
| 1121683 | 7/1968 | United Kingdom . |
| 2177711 | 1/1987 | United Kingdom . |
| 2326882 | 1/1999 | United Kingdom . |
| WO 97/19748 | 6/1997 | WIPO . |

*Primary Examiner*—Richard D. Lovering
*Assistant Examiner*—Daniel S. Metzmaier
*Attorney, Agent, or Firm*—Michael B. Martin; Thomas M. Breininger

[57] ABSTRACT

This invention is directed to a gelling agent composition comprising the reaction product of a high molecular weight gelling agent additive, a low molecular weight phosphate diester acid, and a Group II or Group III metal salt, to methods of preparing the gelling agent composition, to a gelled hydrocarbon liquid comprising the gelling agent composition and to a method of fracturing subterranean formations using the gelled hydrocarbon liquid.

17 Claims, No Drawings

GELLING AGENT FOR HYDROCARBON LIQUID AND METHOD OF USE

CROSS REFERENCE TO RELATED APPLICATIONS

This is a continuation in part of Ser. No. 08/951,388, filed Oct. 16, 1997, now abandoned.

TECHNICAL FIELD

This invention concerns a method of fracturing subterranean formations using gelled hydrocarbon liquids, to methods of preparing the gelled hydrocarbon liquids, to gelling agent compositions useful for preparing the gelled hydrocarbon liquids and to methods of preparing the gelling agent compositions.

BACKGROUND OF THE INVENTION

Hydraulic fracturing has been widely used as a means for improving the rates at which fluids can be injected into or withdrawn from subterranean formations surrounding oil wells and similar boreholes. The methods employed normally involve the following steps: injection of a viscous fracturing fluid having a low fluid loss value into the well at a rate sufficient to generate a fracture in the exposed formation, the introduction of fluid containing suspended propping agent particles into the resultant fracture, and the subsequent shutting in of the well until the formation is closed on the injected particles. This results in the formation of vertical, high-conductivity channels through which fluids can thereafter be injected or produced. The conductivity in the propped fracture is the function of the fracture dimensions and the permeability of the bed of propping agent particles within the fracture.

In order to generate a fracture of sufficient length, height, and width and to carry the propping agent particles into the fracture, it is necessary for the fluid to have relatively high viscosity. This requires the use of gelling agents in the fracturing fluid.

Fracturing fluids are generally water or oil-based liquids gelled with polymers. However, the water-based liquids cannot be used in the fracturing of many water sensitive formations. Fracturing in these formations requires the use of oil-based liquids.

The most common gelling agent for oil-based fracturing fluids has been aluminum salts of phosphate esters. The following references discloses phosphate ester gelling agents:

(a) U.S. Pat. No. 4,104,173 discloses gelling agents prepared by
   (i) reacting phosphorous pentoxide with monohydric alcohols and
   (ii) reacting this product with a basic aluminum compound.

(b) U.S. Pat. No. 4,316,810 discloses gelling agents prepared by
   (i) reacting phosphorous pentoxide with ethereal alcohols prepared by reacting ethylene oxide or propylene oxide with selected aliphatic alcohols to form a phosphate ester and
   (ii) reacting phosphate ester with an aluminum compound to form the aluminum salt of the phosphate ester.

(c) U.S. Pat. No. 4,787,994 discloses the use of an ail with a gelling agent prepared by reacting an orthophosphate ester with an aluminum activator. The acid is mixed with the orthophosphate ester prior to the addition of the activator.

(d) U.S. Pat. No. 4,877,894 and 5,057,233 discloses gelling agents prepared by
   (i) reacting triethyl phosphate with phosphorous pentoxide to form a polyphosphate intermediate,
   (ii) reacting the polyphosphate intermediate with a mixed aliphatic alcohol. This product is then reacted with an aluminum activator to form the aluminum alkylphosphate ester gelling agent.

(e) U.S. Pat. No. 5,190,675 discloses a metal phosphate diester prepared by reacting a triester phosphate with $P_2O_5$ to form a polyphosphate which is reacted with an alcohol to produce a phosphate diester. The diester is then contacted with an aluminum source (in the hydrocarbon liquid) to form the aluminum phosphate diester.

(f) U.S. Pat. No. 5,202,035 discloses a gelling agent similar to that disclosed in 5,057,233, except that an aluminum sulfate was used as a mixture with the aliphatic alcohol.

(g) U.S. Pat. No. 5,514,645 discloses a gelling agent comprising two components to be added to the liquid hydrocarbon:
   (i) an alkyl orthophosphate acid ester partially neutralized with an alkali metal hydroxide, and
   (ii) a source of aluminum or ferric ions.

(h) U.S. Pat. Nos. 5,417,287; 5,571,315; 5,614,010; and 5,647,900 disclose organic phosphate gelling agents and (i) ferric salts, or (ii) ferric ammonium citrate, or (iii) ferric ions, an amine, and polycarboxylic acid, or (iv) a ferric salt reacted with a low molecular weight amine.

(i) U.S. Pat. No. 4,200,540 discloses gelling agents made from reacting low molecular weight alcohols with phosphorous pentoxide, which in turn is reacted with a basic aluminum compound.

One of the problems associated with oil based gelling agents is that they generate viscosity slowly, which means that the viscosified oil must be premixed by a batch process. In some fracturing operations, it would be highly desirable and economical to carryout the fracturing operations by a continuous process wherein the oil is viscosified "on the fly." The continuous operation requires the use of a fast acting gelling agent.

SUMMARY OF THE INVENTION

We have discovered gelling agent compositions which rapidly viscosify an oil base fracturing fluid. This rapid viscosification or gelling of the fracturing fluid aids in the process of the addition and suspension of the propping agent during the fracturing operations.

Accordingly, in its principal aspect, this invention is directed to a gelling agent composition comprising the reaction product of (a) a high molecular weight gelling agent additive;

(b) a low molecular weight phosphate ester acid; and (c) a Group II or Group III metal salt.

DETAILED DESCRIPTION OF THE INVENTION

"Apparent pH" means the measured pH of a hydrocarbon continuous liquid.

"Molecular weight" (MW) means number average molecular weight.

"Ester" means mono- and di-esters, and mixed esters.

"High molecular weight gelling agent additive" means the reaction product of a polyakylene glycol (PAG) having a molecular weight of 1,000 to 26,000 wherein the repeating alkylene unit comprises 3 to 4 carbon atoms and $P_2O_5$ or a polyphosphate prepared by reacting a trialkylphosphate with $P_2O_5$.

The PAG is either polypropylene glycol or polybutylene glycol (or co- or ter-polymers containing ethylene glycol links), with the former being preferred, and having a molecular weight of 1,000 to 26,000, preferably 6,000 to 26,000, and more preferably 8,000 to 18,000.

The alkyl groups of the trialkyl phosphate are from 1 to about 6 carbon atoms, preferably 2 to 4 carbon atoms. The preferred phosphate is triethyl phosphate (TEP).

PAGs for incorporation into the high molecular weight gelling agent additives are prepared using a catalyst selected from the group consisting of barium, strontium and their oxides, hydroxides, hydrated hydroxides, or monohydroxide salts, or mixtures thereof or a double metal cyanide complex compound wherein one of the metals of said complex compound is selected from the group consisting of Zn(II), Fe(II), Fe(III), Co (II), Ni(II), Mo(IV), Al(III), V(IV), V(V), Sr(II), W(IV), W(VI), Mn(II), and Cr(III) and mixtures thereof, and wherein the other metal of said complex compound is a metal selected from the group consisting of Fe(II), Fe(III), Co(II), Co(III), Cr(II), Cr(III), Mn(II), Mn(III), V(IV), V(V), and mixtures thereof. These methods are described in detail in U.S. Pat. No. 5,010,187, the disclosure of which are incorporated herein by reference.

"Low molecular weight phosphate diester acid" means a compound of formula:

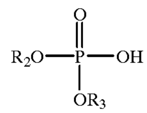

wherein $R_2$ and $R_3$ are independently H, aryl or $C_1$–$C_{24}$alkyl. The synthesis of low molecular weight phosphate diester acids is well known in the art. See for example U.S. Pat. Nos. 4,877,894, 5,057,233, and 5,110,485, incorporated herein by reference.

"Group II or Group III metal salt" means a salt of a Group II or Group III metal. Representative salts include ammonium citrate, sodium aluminate, aluminum sulfate, alumina, ferric sulfate, ferric sulfate reacted with a low molecular weight amine such as triethanolamine, and the like.

The gelling agent composition is the reaction product of a high molecular weight gelling agent additive; a low molecular weight phosphate diester acid; and a Group II or Group III metal salt as defined herein.

The reaction of the three components may be in a batch process wherein the three components are reacted simultaneously, or by sequence wherein the high molecular weight gelling agent additive and the low molecular weight phosphate ester acid are first reacted to form an ester or diester, which is then reacted with the Group II or Group m metal salt.

The gelling agent composition may be preformulated for addition to the oil base fracturing fluid, or formed in situ in the fracturing fluid.

In a preferred aspect, the high molecular weight gelling agent additive has formula

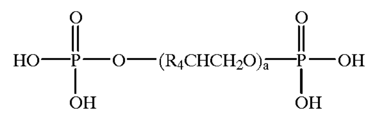

wherein $R_4$ is $CH_3$ or $C_2H_5$ and a is an integer from 13 to 450. The preferred values of "a" are determined by the preferred molecular weight ranges of the starting material PAG. For example if $R_4$ is $CH_3$ and the preferred molecular weight range is 6,000 to 26,000, then "a" will be from about 103 to about 450. If $R_4$ is $C_2H_5$ for the same molecular weight range, "a" will be from about 83 to about 360. The value of "a" for the other specified ranges may be similarly calculated.

The preferred method of synthesizing the high molecular weight gelling agent additive is by reacting the PAG with $P_2O_5$. For example by reacting a slurry of about 4 wt % $P_2O_5$, about 70 wt % PAG, and about 24 wt % of a solvent such as heptane at ambient temperature.

In another preferred aspect, the low molecular weight phosphate diester acid has formula

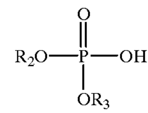

wherein $R_2$ and $R_3$, which may be the same or different, are $C_6$–$C_{10}$alkyl.

Preferred low molecular weight phosphate diester acids are prepared by reacting a polyphosphate intermediate (produced by the reaction of triethyl phosphate (TEP) and $P_2O_5$) with a mixture of $C_6$–$C_{14}$ aliphatic alcohols.

In particular, the low molecular weight phosphate diester acids are prepared by reacting first phosphorous pentoxide with triethyl phosphate in the presence of a solvent (xylene) to form a polyphosphate intermediate. Temperature maximum to this point in the procedure is carefully controlled not to exceed about 85° C. Subsequently a mixture of $C_6$–$C_{10}$ aliphatic alcohols, are added and the reaction mixture is heated to about 120° C. to form a predominantly phosphate diester. A representative feed composition of this process is shown below:

| Material | Wt % |
|---|---|
| Triethylphosphate (TEP) | about 25 |
| Phosphorous Pentoxide | about 15 |
| C-6-10 Alcohol | about 35 |
| xylene | about 25 |

In a more preferred aspect, the high molecular weight gelling agent additive has formula:

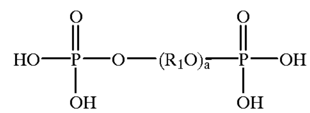

wherein $R_1$ is $C_3$ alkylene and a is an integer from about 103 to about 450.

In a still more preferred aspect, the gelling agent composition comprises (a) from 0.05 to 20 weight percent of a compound of formula:

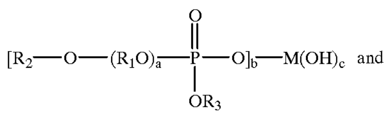

(b) from 80 to 99.95 weight percent of a compound of formula:

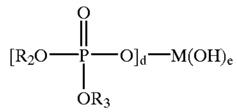

wherein a is an integer from 100 to 200;

b and d are independently 1, 2 or 3;

c and e are independently 0, 1 or 2;

b+c=3;

d+e=3;

$R_1$ is $C_3$alkylene;

M is $Al^{+++}$ or $Fe^{+++}$; and $R_2$ and $R_3$ are independently H, aryl or $C_1$–$C_{24}$alkyl.

In another still more preferred aspect, $R_2$ and $R_3$ are independently $C_6$–$C_{10}$ alkyl.

In a still yet more preferred aspect, compound (a) comprises from 0.5 to 6.0 weight percent of the gelling agent composition and compound (b) comprises from 99.5 to 94 weight percent of the gelling agent composition.

In another still yet more preferred aspect, c and e are 2 and b and d are 1.

In another aspect, this invention is directed to a method of preparing the gelling agent composition of claim 1 comprising simultaneously reacting the high molecular weight gelling agent additive, the low molecular weight phosphate diester acid and the aluminum or ferric salt.

In another aspect, this invention is directed to a method of preparing the gelling agent composition of claim 1 comprising reacting the high molecular weight gelling agent additive with the low molecular weight phosphate diester acid to form an ester or diester and reacting the ester or diester with the aluminum or ferric salt.

When using an iron source ($Fe^{+++}$), it is preferred to premix the high molecular weight gelling agent additive with the low molecular weight phosphate diester acid at a weight ratio wherein premix the high molecular weight gelling agent additive component constitutes not more than 20 weight percent, preferably more than 10 weight percent, and more preferably not more than 6 weight percent of the mixture. The resulting ester mixture is then added to the hydrocarbon liquid along with a source of iron such as the reaction product of ferric sulfate and triethanolamine in an aqueous solution. The ester mixture may be added to the hydrocarbon liquid before or after the addition of source of the iron.

When using an aluminum source ($Al^{+++}$), the preferred procedure is to add an aluminum source such as aluminum sulfate tetradecahydrate to the mixture of the high molecular weight gelling agent additive and the low molecular weight phosphate diester acid in the proper stoichiometry, to form aluminum salts of the high molecular weight gelling agent additive (HMW phosphate ester salt) and the low molecular weight phosphate ester acid (LMW ester salt).

Representative starting materials are as follows:

| | |
|---|---|
| phosphate esters (LMW and HMW) | 55–60 wt % |
| aluminum sulfate tetradecahydrate | 15–20 wt % |
| solvent (e.g. xylene and heptane) | 20–30 wt %. |

The weight ratio of the components comprising the gelling agent composition, may range within relatively wide ranges as shown in Table 1:

TABLE 1

Representative Gelling Agent Compositions

| | HMW Salt | LMW Salt |
|---|---|---|
| Broad Range | 0.05 to 20 wt %* | 80 to 99.95 wt % |
| Preferred Range | 0.1 to 10 wt % | 90 to 99.90 wt % |
| Most Preferred Range | 0.5 to 6 wt % | 94 to 99.50 wt % |

*wt % means weight percent based on the combined weights of the HMW and LMW salts In another aspect, this invention is directed to a gelled hydrocarbon liquid comprising a hydrocarbon liquid and the gelling agent composition of claim 1.

In a preferred aspect of the foregoing, the gelling agent composition comprises a mixture of (a) from 0.05 to 20 weight percent of a compound of formula:

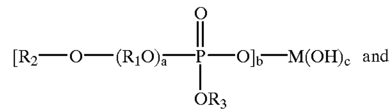

(b) from 80 to 99.95 weight percent of a compound of formula:

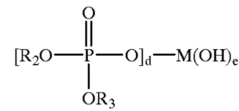

wherein a is an integer from 105 to 450;

b and d are independently 1, 2 or 3;

c and e are independently 0, 1 or 2;

b+c=3;

d+e=3;

$R_1$ is $C_3$alkylene;

M is $Al^{+++}$ or $Fe^{+++}$; and $R_2$ and $R_3$ are independently H, aryl or $C_1$–$C_{24}$alkyl.

In a more preferred aspect of the foregoing, M is $Al^{+++}$.

In another more preferred aspect of the foregoing, b is 2

In a still more preferred aspect of the foregoing, the gelling agent composition is present in the hydrocarbon liquid in sufficient amounts to provide the hydrocarbon liquid with a viscosity of at least 50 cps at 100° F. when measured at 118 rpm with a Fann 50 C viscometer at $r_1b_5$ rotor/bob configuration.

In another aspect, this invention is directed to a method of preparing a gelled hydrocarbon liquid comprising adding a gelling agent composition to the hydrocarbon liquid.

According to this aspect of the invention, the high molecular weight gelling agent additive is reacted with the low molecular weight phosphate diester acid and a Group II or Group III metal salt compound to form the gelling agent composition having the compositions shown in Table 1. Preferred Group II and Group III metal salts are the salts of $Al^{+++}$ and $Fe^{+++}$.

The reactions may be carried out in the presence of from 10 to 50 wt % of a solvent such as xylene, heptane, and the like.

The preformulated gelling agent composition may be added to the hydrocarbon liquid at the well site. The hydrocarbon liquids may be any of those currently used in oil base fracturing, including crude oil, diesel, fuel oil, refined oil, condensate, and the like.

In practice the gelling agent composition will be added as a formulation in a solvent such as diesel, kerosene or aromatic, wherein the gelling agent composition will constitute from about 50 to 90 weight percent and preferably 60 to 80 weight percent of the formulation.

The concentration of the gelling agent in the hydrocarbon liquid, of course, will depend on the viscosity desired. Generally, concentrations in the range of 0.1 to 3.0 weight percent based on the weight of the fracturing fluid will generate sufficient viscosity for purposes of the present invention. At least 50 cp at 100° F. and 118 rpm as measured with a Fann 50C viscometer at $r_1b_5$ rotor/bob configuration.

Also added to the hydrocarbon liquid is a basic activator to adjust the apparent pH to between about 3 and 5. The activator base may include aqueous solutions of an alkali metal hydroxide (e.g. KOH) or a low molecular weight amine such as triethanolamine or polyamine along with about 0.1 to 3 wt % water.

In another aspect, this invention is directed to a method of preparing a gelled hydrocarbon liquid comprising (a) reacting a high molecular weight gelling agent additive with a low molecular weight phosphate diester acid to form an ester or diester;

(b) adding the ester or diester to the hydrocarbon liquid to form a ester or diester/hydrocarbon liquid mixture; and (c) adding a ferric or aluminum salt to the ester or diester/hydrocarbon liquid mixture.

According to this aspect of the invention, the high molecular weight gelling agent and the low molecular weight phosphate diester acid are premixed (in the weight ratios described above) and added to the oil. The appropriate amounts of the Group II or Group III metal salt, preferably an aqueous solution of the metal base, along with an organic base such as triethanolamine for pH control (3 to 5) are also added to the oil. The preferred order of addition is first the two gelling agent components, with agitation, followed with the aqueous base solution, also with agitation.

As described previously, when using the ferric salts of the high molecular weight gelling agent and the low molecular weight phosphate diester acid, it is preferred to use the in situ gelling procedure.

In another aspect, this invention is directed to a method of fracturing a subterranean formation comprising injecting the gelled hydrocarbon liquid of claim 11 into the formation at a rate sufficient to generate a fracture in the formation.

According to this aspect, the gelled hydrocarbon liquid is pumped into the formation at a rate and pressure sufficient to fracture the formation. Propping agents are carried in the gelled fracturing fluid and placed in the fracture. Following the fracturing treatment, the well is shut in.

The gelling and pumping operation may be by the batch process but preferably is by the continuous process. The rapid viscosification of the oil by the compositions of the present invention offer advantages in both types of operations. Preferably fracturing liquid will contain a breaker, or viscosity reducer, to controllably deliver proppant to the formation followed by subsequent proppant deposition, accomplished generally by viscosity reduction, i.e. decreasing the ability of the hydrocarbon to suspend solids. Hydrocarbon de-viscosification after fracture also facilitates well cleanup in many instances. The viscosity reducers, normally referred to as "breakers", consist of many types though most function through apparent pH modification. In alkyl phosphate ionic complexes in hydrocarbon, inorganic base breakers are generally used, for example sodium carbonate, bicarbonate, calcium hydroxide or magnesium hydroxide. Organic bases such as alkylamines are also used. Acidic breakers such as aromatic acids, i.e. benzoic acid, toluene sulfonic acid are effective though not generally commercially used.

Typical hydrocarbon fracturing fluid compositions generally consist of viscosifiers, breakers, corrosion inhibitors, surfactant, $CO_2$ and wetting agents to perform specific functions designed to enhance the probability of success of the fracturing treatment.

The foregoing may be better understood by reference to the following Examples which are presented for purposes of illustration and are not intended to limit the scope of the invention.

A low molecular weight phosphate ester "control" sample (Sample C-1) and its aluminum salt (Sample C-2) were synthesized from the raw materials described in Table 2.

The phosphate ester was prepared by reacting first phosphorous pentoxide with triethyl phosphate in a xylene solvent to form a polyphosphate intermediate. Temperature maximum to this point in the procedure was carefully controlled not to exceed about 85° C. Subsequently a mixture of $C_6$–$C_{10}$ aliphatic alcohols was added and the reaction mixture was heated to about 120° C. to form a predominantly phosphate diester. Sample C-1 was added to Kerosene containing a basic iron salt and tested as Test #1.

The aluminum salt sample (C-2) of the above composition (C-1) was prepared by adding the C-1 sample to aluminum sulfate tetradecahydrate with xylene and heptane, followed by heating to azeotropically remove water via an equipped Dean Stark trap. Maximum temperature of the flask contents was 116° C. This composition was tested in Test #2.

TABLE 2

Comparative Samples

| Raw Materials | | Raw Materials | |
|---|---|---|---|
| Sample C-1 (LMW diester) | (wt percent) | Sample C-2 (LMW A1 Salt) | (wt percent) |
| Triethylphosphate (TEP) | 24 | Sample C-1 | 56 |
| Phosphorous Pentoxide | 14 | Aluminum Sulfate Hydrate | 16 |
| C-6/10 Mixed alcohols | 37 | Xylene and heptane | 28 |
| Xylene and heptane | 25 | | |

Analogous gelling agents of the present invention were prepared from the feed compositions shown in Table 3.

TABLE 3

| | Sample A HMW and LMW esters (wt percent) | Sample B HMW and LMW esters (wt percent) |
|---|---|---|
| Triethylphosphate (TEP) | 23 | 23 |

TABLE 3-continued

| | Sample A HMW and LMW esters (wt percent) | Sample B HMW and LMW esters (wt percent) |
|---|---|---|
| Phosphorous Pentoxide | 14 | 14 |
| C6/10 Mixed alcohols | 36 | 35 |
| Xylene and heptane | 26 | 24 |
| PPG* | 1.0 | 4.0 |

*molecular weight between 8,000 and 14,000

The aluminum salt of Sample A was prepared. The composition of the raw materials is shown in Table 4.

TABLE 4

| Sample C (A1 HMW and LMW Salts) | |
|---|---|
| Raw Materials | (wt percent) |
| Sample A | 56 |
| Aluminum Sulfate Hydrate | 16 |
| Xylene and heptane | 28 |

The compositions of Samples A and B were each prepared by (a) reacting TEP with $P_2O_5$ in the solvent containing $C_6$–$C_{10}$ mixed alcohols and (b) reacting $P_2O_5$ with PPG. The reaction products of (a) and (b) were added to the kerosene containing the basic iron salt aqueous solution. The iron salt of Sample A and Sample B thus were formed in situ. The gelling compositions in the two samples constituted about 1 and 5 wt %, respectively of the HMW salt in the Kerosene. These compositions were tested as Test #3 and #5.

The Sample C composition was preformulated by preparing Sample A as described above and reacting Sample A with aluminum sulfate; and tested as Test #4.

Rheological properties of the above described compositions were determined on a Fann 50C viscometer equipped with $r_1b_5$ rotor bob configuration and measured at 118 rpm at 150° F.

Sample preparation was conducted as follows:

To a quart baffle design 3-blade propeller design Waring pitcher was added 200 ml kerosene the gellant composition and the activator solution. The amounts of each gellant and activator solution and type are given in Table 5. The compositions in the pitcher were stirred for 60 seconds at low constant stir and placed on the Fann 50C for constant shear evaluation.

TABLE 5

| Test # | Gellant Type (Sample) | Gellant Dosage, mls (in 200 mls kerosene) | Activator Type | Dosage, ml |
|---|---|---|---|---|
| 1. | C-1 diester | 2.0 | Basic Iron Salt* (aqueous) | 3.0 |
| 2. | C-2 Salt (A1) | 2.0 | 17.0 wt % KOH (aqueous) | 0.80 |
| 3. | A mixed esters | 2.0 | Basic Iron Salt* (aqueous) | 3.0 |
| 4. | C Salt (A1) | 2.0 | 17.0 wt % KOH (aqueous) | 0.80 |
| 5. | B mixed esters | 2.0 | Basic Iron Salt* (aqueous) | 3.0 |

*Basic Iron Salt aqueous solution prepared by adding 9 parts of 20 wt % $Fe_2(SO_4)_3$ $5H_2O$ solution to 1 part triethanolamine and mixing briefly to form solution.

Table 6 presents the rheological data comparing the aluminum salt of a prior art composition to the aluminum salt of a composition of the present invention.

TABLE 6

| | | Viscosity in Centipoise (+/−5cps error) | |
|---|---|---|---|
| Elapsed Time (min) | Temperature (° F.) | Test #2 Sample C-2 (Alum. Salt) | Test #4 Sample C (Alum. Salt) |
| 5 | 76 | 116 | 217 |
| 15 | 104 | 139 | 261 |
| 30 | 134 | 138 | 361 |
| 60 | 150 | 159 | 391 |

From observation of the date in Table 6, it is clear that incorporation of the HMW PAG additive into the gelling composition greatly enhances viscosity under the test conditions. Moreover, the Test #4 (Sample C) gels in the pitcher (within about 15.20 secs) which is particularly advantageous for continuous mix injection of very rapidly fracturing additives into a wellbore.

Table 7 compares the rheological data comparing in-situ activated gelling agents of a prior art geller with those of the present invention.

TABLE 7

| | | Viscosity in Centipoise (+/−5cps error) | | |
|---|---|---|---|---|
| Elapsed Time (min) | Temp (° F.) | Test #1 Sample C-1 LMW Fe Salt | Test #3 Sample A Mixed Fe Salts | Test #5 Sample B Mixed Fe Salts |
| 5 | 87 | 588 | 649 | 897 |
| 10 | 99 | 615 | 860 | 740 |
| 15 | 116 | 715 | 838 | 718 |
| 30 | 142 | 857 | 835 | 1003 |
| 45 | 152 | 914 | 911 | 1009 |

As demonstrated by the Table 7 data, the iron salts were synthesized using HMW PAG (Tests #3) and gelled the kerosene much faster than prior art geller (Test #1). Gelation in the Waring pitcher under the test conditions was approximately 10–15 seconds with the PPG additives.

What is claimed is:

1. A gelling agent composition comprising the reaction product of:

(a) a high molecular weight gelling agent additive comprising the reaction product of;

(aa) a polyalkylene glycol having a molecular weight of 6,000 to 26,000 wherein the alkylene unit consisting of 3 to 4 carbon atoms optionally including copolymers or terpolymers having ethylene oxide links, with (ab) $P_2O_5$ or a polyphosphate prepared by reacting a trialkylphosphate having 1 to 6 carbon atoms with $P_2O_5$;

(b) a low molecular weight phosphorous compound having the formula;

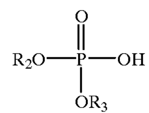

wherein $R_2$ and $R_3$ are independently H, aryl or $C_1$–$C_{24}$ alkyl; and (c) a Group II or Group m metal salt.

2. The gelling agent composition of claim 1 wherein the polyalkylene glycol is polypropylene glycol having a molecular weight of 6,000 to 26,000.

3. The gelling agent composition of claim 1 wherein the high molecular weight gelling agent additive of has formula:

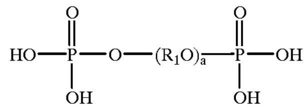

wherein $R_1$ is $C_3$ alkylene and a is an integer from about 103 to about 450.

4. The gelling agent composition of claim 1 comprising:

(a) from 0.05 to 20 weight percent of a compound of the formula:

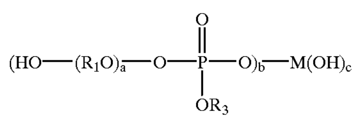

(b) from 80 to 99.95 weight percent of a compound of formula:

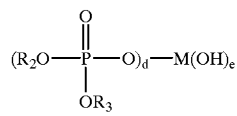

wherein;

a is an integer such that H—O—$(R_1O)_a$—O— has a molecular weight of 6000 to 26000;

b and d are independently 1, 2, or 3;

c and e are independently 0, 1, or 2;

b+c=3;

d+e=3;

$R_1$ is $C_3$ alkylene;

M is $Al^{+++}$ or $Fe^{+++}$; and wherein $R_2$ and $R_3$ are independently H, aryl or $C_1$–$C_{24}$ alkyl.

5. The gelling agent composition of claim 4 wherein $R_2$ and $R_3$ are independently $C_6$–$C_{10}$ alkyl.

6. The gelling agent composition of claim 4 wherein compound (a) comprises from 0.5 to 6.0 weight percent of the gelling agent and compound (b) comprises from 99.5 to 94 weight percent of the gelling agent.

7. The gelling agent composition of claim 4 wherein c and e are 2 and b and d are 1.

8. A method of preparing a gelling agent composition of claim 1 comprising simultaneously reacting the high molecular weight gelling agent additive, the low molecular weight phosphorous compound and a metal salt, wherein the metal salt is an aluminum or ferric salt.

9. A method of preparing a gelling agent composition of claim 1 comprising reacting the high molecular weight gelling agent additive with the low molecular weight phosphorous compound to form an ester or diester and reacting the ester or diester with an aluminum or ferric salt.

10. A gelled hydrocarbon liquid comprising a hydrocarbon liquid and the gelling agent composition of claim 1.

11. The gelled hydrocarbon liquid of claim 10 comprising:

(a) from 0.05 to 20 weight percent of a compound of the formula:

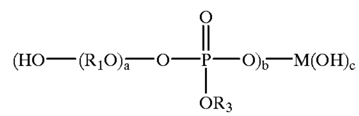

(b) from 80 to 99.95 weight percent of a compound of formula:

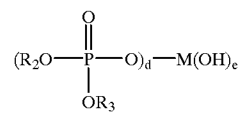

wherein;

a is an integer such that H—O—$(R_1O)_a$—O— has a molecular weight of 6000 to 26000;

b and d are independently 1, 2, or 3;

c and e are independently 0, 1, or 2;

b+c=3;

d+e=3;

$R_1$ is $C_3$ alkylene;

M is $Al^{+++}$; and wherein $R_2$ and $R_3$ are independently H, aryl or $C_1$–$C_{24}$ alkyl.

12. The gelled hydrocarbon liquid of claim 11 wherein M is $Al^{+++}$.

13. The gelled hydrocarbon liquid of claim 11 wherein b is 2.

14. The gelled hydrocarbon liquid of claim 11 wherein the gelling agent is present in the hydrocarbon liquid in sufficient amounts to provide the hydrocarbon liquid with a viscosity of at least 50 cps at 100° F. when measured at 118 rpm with a Fann 50 C viscometer at $r_1b_5$ rotor/bob configuration.

15. A method of preparing a gelled hydrocarbon liquid comprising adding the gelling agent composition of claim 1 to the hydrocarbon liquid.

16. A method of fracturing a subterranean formation comprising injecting the gelled hydrocarbon liquid of claim 10 into the formation at a rate sufficient to generate a fracture in the formation.

17. A method of preparing a gelled hydrocarbon liquid comprising (a) reacting a high molecular weight gelling agent additive comprising the reaction product of;

(aa) a polyalkylene glycol having a molecular weight of 6,000 to 26,000 wherein the alkylene unit consisting of 3 to 4 carbon atoms optionally including copolymers or terpolymers having ethylene oxide links, with (ab) $P_2O_5$ or a polyphosphate prepared by reacting a trialkylphosphate having 1 to 6 carbon atoms with $P_2O_5$; with (ac) a low molecular weight phosphorous compound having the formula;

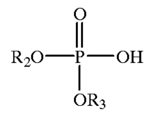

wherein $R_2$ and $R_3$ are independently H, aryl or $C_1$–$C_{24}$ alkyl; to form a ester or diester; and (b) adding the ester or diester to the hydrocarbon liquid to form a ester or diester/hydrocarbon liquid mixture; and (c) adding a ferric salt or aluminum salt to the ester or diester/hydrocarbon liquid mixture.

* * * * *